United States Patent [19]

McMichael

[11] Patent Number: 4,865,737
[45] Date of Patent: Sep. 12, 1989

[54] FILTER SUPPORT FOR DISPOSABLE COFFEE FILTERS

[76] Inventor: John R. McMichael, 2126 Renz Rd., Durham, Calif. 95938

[21] Appl. No.: 292,913

[22] Filed: Jan. 3, 1989

[51] Int. Cl.$^4$ .............................................. B01D 35/02
[52] U.S. Cl. ................................... 210/477; 210/479; 210/482; 99/295
[58] Field of Search ............... 210/469, 473, 474, 477, 210/478, 479, 480, 481, 482; 99/279, 290, 292, 295, 298, 300, 317, 323, 306; 220/403, 404

[56] References Cited

U.S. PATENT DOCUMENTS

| | | | |
|---|---|---|---|
| 1,111,249 | 9/1914 | Courtwright | 210/474 |
| 2,496,757 | 2/1950 | Sieling | 210/474 |
| 2,684,624 | 7/1954 | Alvarez | 210/474 |
| 3,388,804 | 6/1968 | Hester | 210/474 |
| 4,075,105 | 2/1978 | Steiner et al. | 210/477 |
| 4,656,932 | 4/1987 | Kopp | 99/295 |
| 4,728,425 | 3/1988 | Sandvig | 210/477 |
| 4,735,719 | 4/1988 | Benedict | 210/474 |
| 4,765,896 | 8/1988 | Hartley et al. | 210/474 |

Primary Examiner—Richard V. Fisher
Assistant Examiner—Wanda L. Millard

[57] ABSTRACT

A cylinder having both ends opened is structured of loosely woven metal or plastic wire. The cylinder is sized to fit vertically in a coffee maker filter basket inside a disposable coffee filter as a filter support. The filter support prevents the walls of the disposable filter from collapsing over the coffee grounds thus reducing chances of coffee grounds being released into the coffee pot. The rounded cylinder comprising this filter support is sized to fit and function in all shapes of coffee maker filter baskets and in other coffee making filter funnels, round, square, and frusto-conical. The filter support of the immediate invention is reuseable.

3 Claims, 3 Drawing Sheets

FILTER SUPPORT FOR DISPOSABLE COFFEE FILTERS

BACKGROUND OF THE INVENTION

1. Field of the Invention

This invention relates to devices and methods used for supporting a disposable paper coffee filter in an erect position within the funnel portion of an automatic drip style coffee machine during the brewing process.

2. Description of the Prior Art

Automatic drip type coffee makers have been in use for some time which use specialized open brewing chambers or funnels designed to slowly filter heated water through the coffee into a coffee pot. These funnels are removably affixed to a housing which contains a heating element which heats a pre-measured amount of water before it is passed through the coffee contained in the funnel. These funnels come in a variety of shapes and sizes, the majority being frusto-conical in shape, with a few being cylindrical or square. A majority of these coffee makers use a disposable paper filter inserted into the funnel to prevent the grounds from being passed into the coffee pot below. Most of these disposable filters are cylindrical in shape and have a flat horizontal bottom surface and outwardly expandable fluted sides which are designed to conform to any shape funnel. The filters are inserted into the interior of the funnel which will generally have a flat horizontal apertured bottom surface and either perpendicular or outwardly inclined sides. One major problem with the paper filters is their tendency to collapse and fold over the coffee as the paper absorbs water. This results in the water flowing over the collapsed side of the filter, taking some of the coffee grounds with it out into the coffee pot below. Several manufacturers of the coffee machines have attempted to correct this problem by providing clips on the top edges of the funnels, but this only serves to retain two sides of the filters, with the two remaining sides left unsupported.

Devices used to support disposable coffee filters which are pertinent to my invention are disclosed in the following U.S. Pat. No. 4,765,896 dated Aug., 23, 1988, issued to Hartley et al; U.S. Pat. No. 4,735,719 dated Apr. 5, 1988, granted to Benedict; U.S. Pat. No. 4,728,425, issued to Sandvig on Mar. 1, 1988; and U.S. Pat. No. 4,656,932, dated Apr. 14, 1987, granted to Kopp. The Hartley device shows a wire basket filter support which is designed to be positioned between the filter and the funnel and not to prevent the sides of the filter from collapsing. The prongs on the bottom surface make it impossible to be inserted into the interior of the disposable paper filter. The Benedict device teaches a circular frusto-conically shaped plastic filter support which is adaptable to only a few styles of cylindrical funnels. Keeping the filter from being pushed down into the funnel when inserting the Benedict device would appear to present a problem due to the outward extending top flange. It is not altogether certain that when the Benedict device is used with the smaller funnels that the over hanging top flange does not interfere with the insertion of the funnel into the housing. The Sandvig device shows a cylindrical frusto-conically shaped plastic filter support having partial openings in the walls for passage of the coffee grounds. The remaining sections of the wall would cause the ground coffee to collect against the interior, either requiring the user to shake and redistribute the grounds through the openings, or risk the result of the brewed coffee being stronger than desired. Coffee will be stronger if it is passed through a thicker layer of grounds than poured over a thin, more widely distributed layer due to the fact the water takes longer to pass through the thicker layer and has more time to absorb the flavor from the grounds. The Kopp invention illustrates an adjustable circular retention ring which is adaptable to circular and frusto-conically shaped funnels only.

SUMMARY OF THE INVENTION

In practicing my invention, I have developed a filter support for disposable coffee filters which prevents collapsing of the sides of the filter, a collapsing usually resulting in coffee grounds eventually ending up in the coffee. My filter support is comprised of an open-weave material formed into an open ended cylinder. The open-weave material is either loosely woven stainless steel, plastic bands, wires, or a notched sheeting material with a multiple of rectangular openings. Plastic coated wire can also be substituted and will function adequately. All of these materials are available ready made, and can be easily formed into cylinders with an assembly operation, thus eliminating the need and the cost of injection or thermal form molds in most cases. My filter support accommodates most shapes of coffee filter baskets and coffee filter funnels round, cylindrical, or square and is sized not to smash convolutions in paper filters. Most past art supports can flatten convolutions in paper coffee filters which reduces filtering rate. My device can be positioned somewhat loosely in the filter basket which allows the saturated filters to fall inward and not directly downward. Therefore, even though the walls or sides of my filter may not be flush with the walls of the funnel or basket they will still serve to sufficiently support the walls of the filter as they fall forward. To use my device, the disposable filter is placed inside the funnel and my filter support positioned vertically in the center of the filter. Since both ends of my filter support are open and the walls comprised of an open weave, no obstruction is created for the introduced ground coffee. The ground coffee is disbursed outward through the open sides of the filter support to the sides of the disposable filter. Heated water can be poured freely through the open top of the filter over the ground coffee. When the water has completely passed through the ground coffee and the filter, the funnel or filter basket is removed, the coffee grounds and disposable filter are dumped, and my filter support is removed and rinsed. After the paper filter and used coffee grounds are discarded and a new filter inserted along with my filter support into the funnel, the drip filter coffee making process can be repeated.

Therefore, a primary object of my invention is to provide a filter support for disposable coffee filters which prevents the sides of the filter from collapsing and causing coffee grounds to be flushed out into the coffee pot.

Another object of my invention is to provide a filter support for disposable coffee filters which can be used with most styles of automatic drip coffee makers.

A further object of my invention is to provide a filter support for disposable coffee filters which does not block or interfere with the distribution of the coffee grounds inside the disposable filter.

A still further object of my invention is to provide a filter support for disposable coffee filters which is easy and cost effective to produce and market.

Other objects and advantages of my invention will become apparent from reading the following specification and subsequent comparison of numbered parts described with similarly numbered parts shown in the accompanying drawings.

DESCRIPTION OF THE PREFERRED EMBODIMENT

Figure 1:
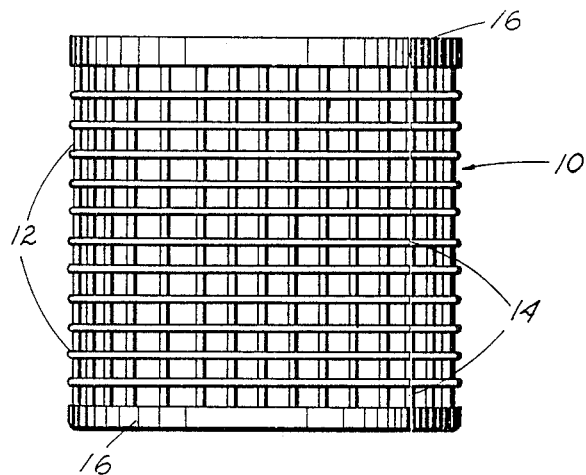
FIG. 1 is a side view of the filter support.
Figure 2:
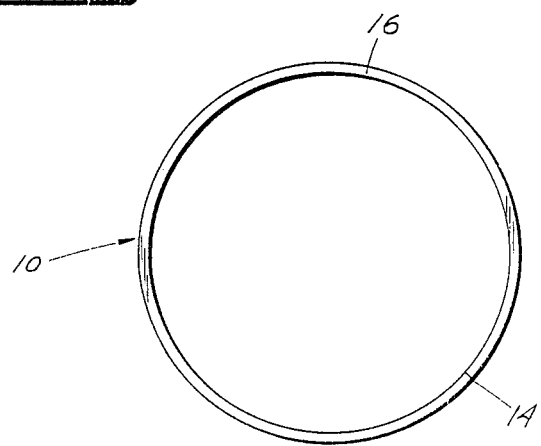
FIG. 2 is a top plan view thereof.
Figure 3:
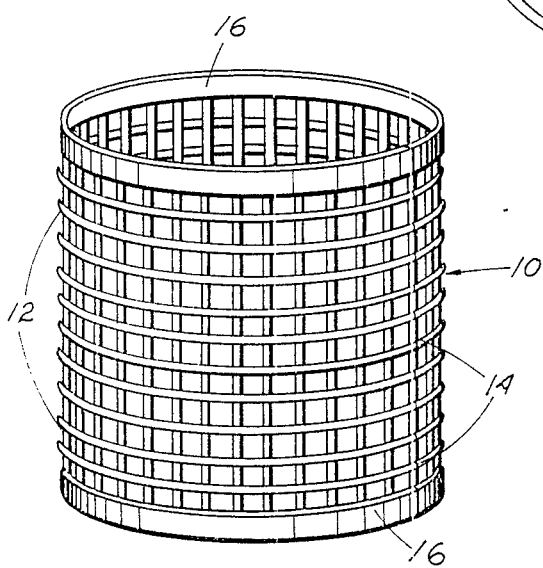
FIG. 3 is a perspective view thereof.
Figure 4:
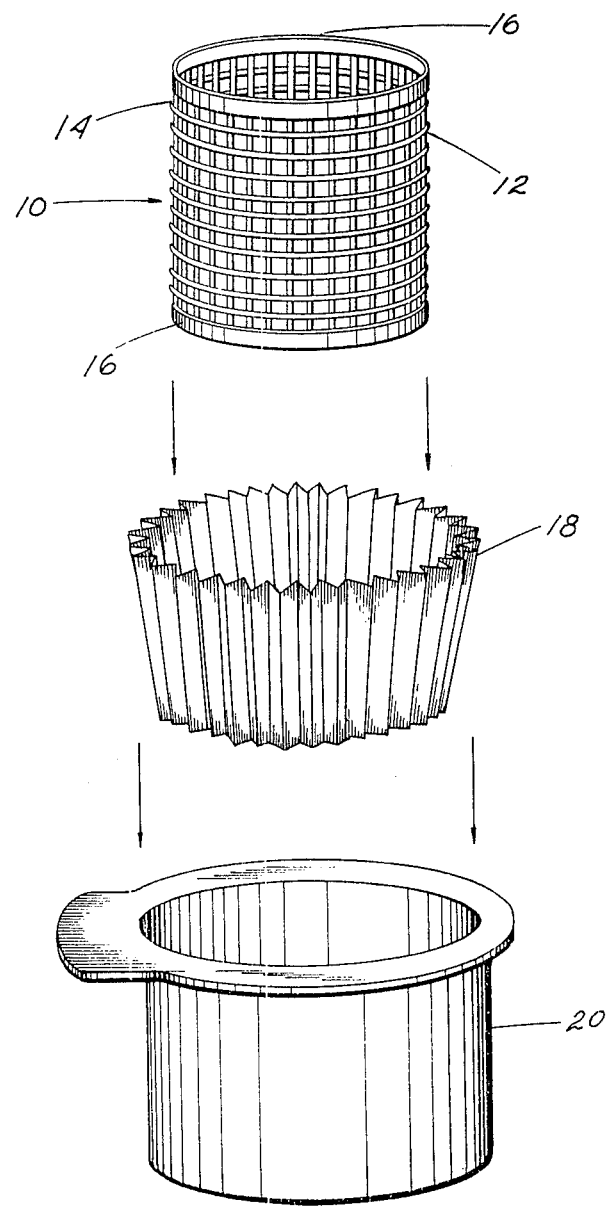
FIG. 4 is a perspective view illustrating the filter support aligned over the disposable filter, which in turn is aligned over the filter basket.
Figure 5:
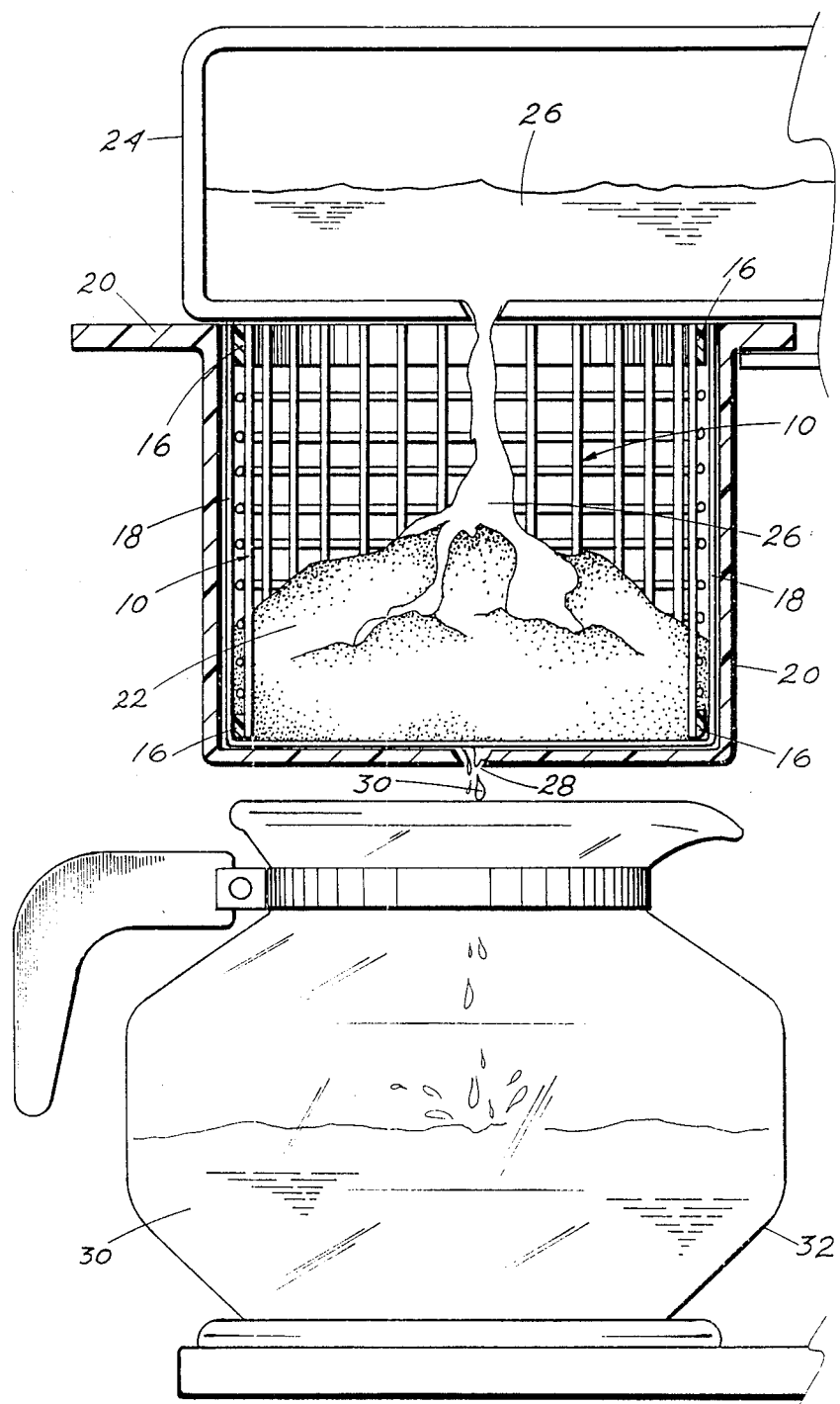
FIG. 5 is a sectional side view of the front section of a coffee maker housing with a sectional side view of the disposable filter inside the filter basket retained by the filter support of the immediate invention. The heated water passing through the ground coffee and the brewed coffee path through the bottom of the filter basket into a coffee pot is illustrated.

Referring now to the drawings and to FIG. 1 where filter support 10 is shown in a side elevation. Filter support 10 is comprised of a heat resistant, non-toxic, non-corrosive open weave material 12. Open weave material 12 can include materials comprised of stainless steel wire, metal wire covered with plastic, or plastic tubing, all formed into flat sheeting material, or flat solid plastic sheeting having a multiple of aligned rectangular or square apertures there through. Open weave material 12 is rolled and affixed into cylinders with a vertical seam 14. Depending upon the material of manufacture, seam 14 is created by metal welding, non-toxic adhesives, sonic bonding or heat sealing of the free edges. The open distal ends of the cylinders of open weave material 12 are affixed with rims 16. Rims 16 are designed to provide smooth edges for filter support 10, and depending on the material of manufacture can be structured in a variety of ways. Rims 16, when manufactured for the stainless steel, plastic tube, or plastic covered wire embodiments are comprised of annular rings each having an annular groove entrenched centrally along the bottom surface which is sized to be inserted over the top or bottom distal ends of the cylindrical open weave material 12. The solid sheet of plastic with apertures has a flat edge incorporated naturally into the design to serve as rims 16.

In use, disposable filter 18 is positioned in filter basket 20 and filter support 10 is inserted vertically inside of disposable filter 18 in filter basket 20. Ground coffee 22 is poured through the upper open end of filter support 10 into disposable filter 18. Ground coffee 22 partially disburses through the walls of filter support 10 to the side walls of disposable filter 18 due to the design of open weave material 12. Filter basket 20 is inserted into position on coffee machine 24. Water 26 is poured into coffee machine 24 where it is heated and slowly released into filter basket 20. Water 26 seeps down through ground coffee 22, through disposable filter 18, and out through aperture 28 located on the bottom surface of filter basket 20. When the filtering process is complete, water 26 is released from filter basket 20 as coffee 30 which is collected below in coffee pot 32. Filter basket 20 is then removed from coffee machine 24, filter support 10 is removed and rinsed with water, and disposable filter 18 is removed and discarded with used ground coffee 22, now coffee grounds. A new disposable filter 18 and the reuseable filter support 10 are inserted into filter basket 20 and the coffee making process can be repeated.

Although several embodiments and materials of manufacture have been suggested and illustrated, it is evident that other styles of the invention fall within the scope of the appended claims. Therefore, the descriptions and drawings are to be considered illustrative only, and not intended to limit the scope of the device.

What I claim as my invention is:

1. A filter support for disposable coffee filters, comprising:
    a hollow cylindrical frame;
    said frame being of an upright cylindrical configuration, having spaced side members vertically disposed supporting wide annular rim members affixed around said side members at terminal ends upwardly and downwardly defining tubular support structure with a rimmed opened top and a rimmed opened bottom for receiving a plurality annular ring members attached around the outside of said side members in spaced parallel alignment with and between said rim members, forming with said vertically spaced side members opened squares in a side walling of said frame;
    said frame being the complete structure of said filter support; and
    said filter support conforming in size and shape for vertically supporting said disposable coffee filters in a manner preventing convolution crushing and reduced filter flow rate.

2. A filter support for disposable coffee filters of claim 1 wherein said filter support is manufactured of steel or plastic.

3. A filter support for disposable coffee filters of claim 1 wherein said filter support is reuseable.

* * * * *